United States Patent
Charlebois et al.

(10) Patent No.: US 12,454,100 B2
(45) Date of Patent: Oct. 28, 2025

(54) POWDER HANDLING DEVICE

(71) Applicant: General Electric Company, Schenectady, NY (US)

(72) Inventors: Anthony Charlebois, Boisbriand (CA); Mathieu Roy, Sainte-Marthe-sur-le-lac (CA)

(73) Assignee: General Electric Company, Evendale, OH (US)

( * ) Notice: Subject to any disclaimer, the term of this patent is extended or adjusted under 35 U.S.C. 154(b) by 444 days.

(21) Appl. No.: 17/978,279

(22) Filed: Nov. 1, 2022

(65) Prior Publication Data

US 2024/0140033 A1  May 2, 2024

(51) Int. Cl.
*B29C 64/307* (2017.01)
*B29C 64/255* (2017.01)
*B33Y 30/00* (2015.01)

(52) U.S. Cl.
CPC .......... *B29C 64/307* (2017.08); *B29C 64/255* (2017.08); *B33Y 30/00* (2014.12)

(58) Field of Classification Search
CPC ..... B29C 64/307; B29C 64/255; B33Y 30/00; B65G 69/181; B65G 53/02
See application file for complete search history.

(56) References Cited

U.S. PATENT DOCUMENTS

| | | | |
|---|---|---|---|
| 4,265,572 A | 5/1981 | Bourdois et al. | |
| 4,730,647 A | 3/1988 | Mulder | |
| RE32,841 E | 1/1989 | Mulder | |
| 5,015,126 A | 5/1991 | Kramer | |
| 5,074,342 A | 12/1991 | Kraehn | |
| 5,271,695 A | 12/1993 | Bischof et al. | |
| 6,024,304 A | 2/2000 | Sawada | |
| 6,056,483 A | 5/2000 | Nakamura et al. | |
| 6,135,676 A | 10/2000 | Anderson | |
| 6,398,462 B1 | 6/2002 | Fulkerson | |
| 8,016,000 B2 | 9/2011 | Jordan et al. | |
| 8,307,859 B2 | 11/2012 | Jordan et al. | |
| 8,307,861 B2 | 11/2012 | Jordan et al. | |
| 9,126,773 B2 | 9/2015 | Hino et al. | |
| 9,815,074 B2 | 11/2017 | Mauchle et al. | |
| 10,751,941 B2 | 8/2020 | Chanclon Fernandez et al. | |
| 2006/0054085 A1 | 3/2006 | Sanner | |
| 2008/0152437 A1 | 6/2008 | Merritt et al. | |

(Continued)

FOREIGN PATENT DOCUMENTS

DE  4239496 A1  5/1994
EP  0184994 A1  6/1986

(Continued)

*Primary Examiner* — Michael M. Robinson
(74) *Attorney, Agent, or Firm* — Dority & Manning, P.A.

(57) ABSTRACT

A powder handling device is provided, along with apparatus and methods of its use. The powder handling device includes a mounting portion defining a plane and comprising a mounting interface; a fixture device configured to mount the mounting portion over an opening of a powder container at a mounting interface; and a powder suction unit attached to the mounting portion and passing through the plane. The powder suction unit is movable relative to the mounting portion with at least one degree of freedom. The powder handling device may be mounted onto an opening of a powder container.

16 Claims, 3 Drawing Sheets

(56) References Cited

U.S. PATENT DOCUMENTS

| | | | |
|---|---|---|---|
| 2011/0277876 A1* | 11/2011 | Jordan | B01J 8/0015 141/8 |
| 2016/0368719 A1 | 12/2016 | Hecht | |
| 2019/0030810 A1* | 1/2019 | Gasso | B29C 64/357 |
| 2019/0126546 A1* | 5/2019 | Chanclon Fernandez | B29C 64/20 |
| 2021/0331395 A1 | 10/2021 | Fernandez et al. | |

FOREIGN PATENT DOCUMENTS

| | | |
|---|---|---|
| EP | 0528755 A1 | 2/1993 |
| JP | S5385085 A | 7/1978 |
| JP | 2007261807 A | 10/2007 |

* cited by examiner

POWDER HANDLING DEVICE

FIELD

The present disclosure generally relates to manufacturing powder storage, transportation, and use.

BACKGROUND

Manufacturing powders, for example those used in additive manufacturing processes, are typically stored and transported to the manufacturing location. Various manufacturing powders present issues with regard to maintaining powder quality and operator safety. Some known methods rely on small disposable containers to manage these risks. The small containers are used to transfer manufacturing powder to an operating chamber. This leads to inefficiency and waste.

BRIEF DESCRIPTION OF THE DRAWINGS

The accompanying drawings, which are incorporated in and constitute a part of this specification, illustrate embodiments of the present disclosure and, together with the description, serve to explain principles of the disclosure.

Other aspects and advantages of the embodiments disclosed herein will become apparent upon consideration of the following detailed description, wherein similar or identical structures may have similar or identical reference numerals.

DETAILED DESCRIPTION

Figure 1:
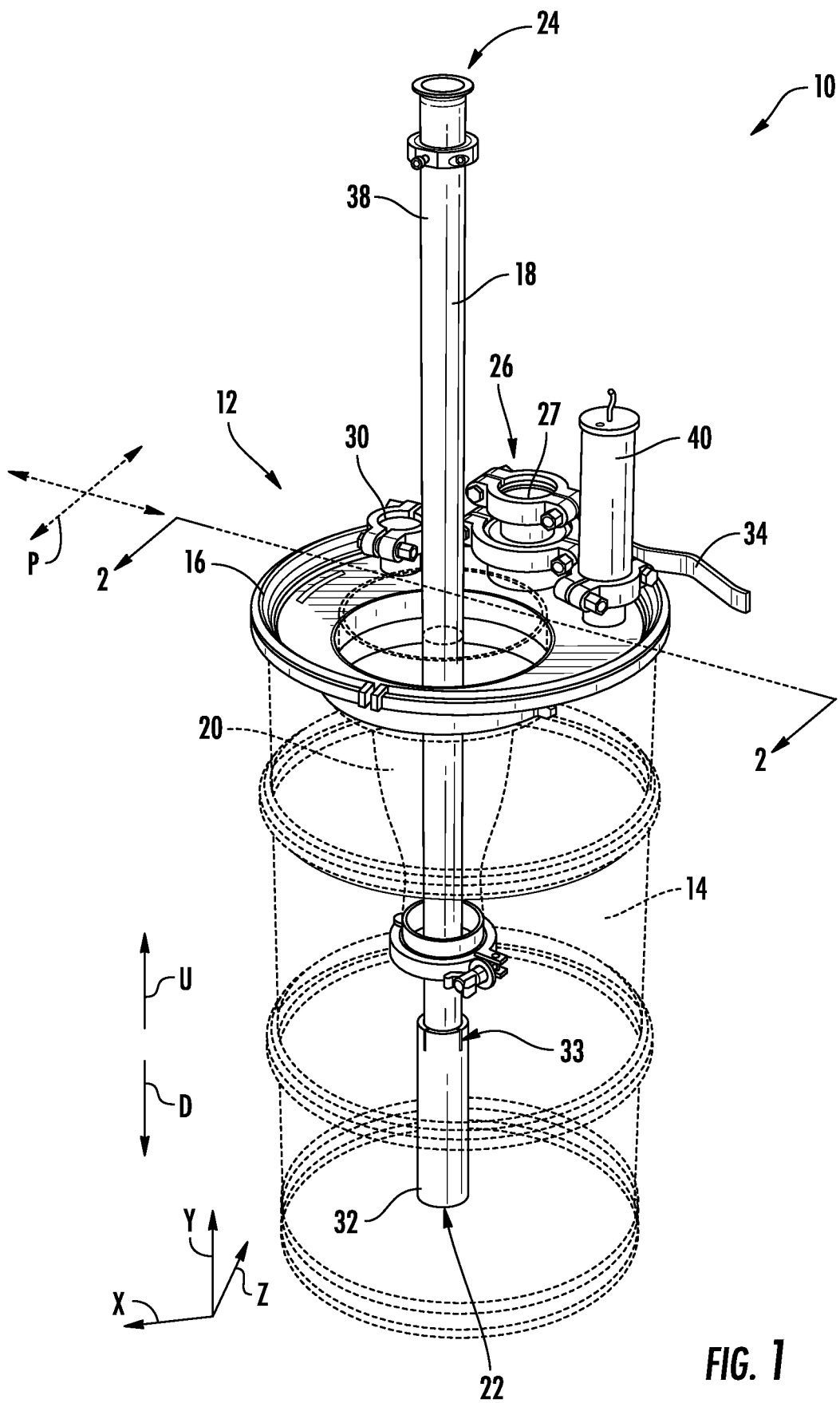
FIG. 1 is a perspective view of a powder handling device according to an embodiment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "substantially", are not to be limited to the precise value specified. In at least some instances, the approximating language may correspond to the precision of an instrument for measuring the value, or the precision of the methods or machines for constructing or manufacturing the components and/or systems. For example, in certain contexts, the approximating language may refer to being within a 10% margin.

Here and throughout the specification and claims, range limitations may be combined and interchanged, such that ranges identified include all the sub-ranges contained therein unless context or language indicates otherwise. For example, all ranges disclosed herein are inclusive of the endpoints, and the endpoints are independently combinable with each other.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The present application is directed generally towards powder handling devices and apparatuses. Manufacturing powders must often be stored and transported to a destination of use, for example in an additive manufacturing apparatus. Powder storage and transportation presents risks to safety, powder contamination, and environmental contamination. These risks are often regulated by governments, leaving little alternative to use of these containers for transportation. However, powder transportation containers provide barriers to use in manufacturing, for example not providing reliable access of all of the powder in a given container. The creators of this disclosure have conceived of powder handling devices and apparatuses that provide safe, efficient, and cost-effective powder transportation, storage, and use. This disclosure provides a powder handling device for end use with a transportation-capable powder container, such as a United Nations ("UN") certified powder transportation container. The disclosure further provides for safe and easy end use of the powder container, for example in conjunction with an additive manufacturing process.

Turning now to the figures, FIG. 1 depicts an embodiment of a powder handling device 10. The term "powder handling device" refers to any apparatus that is configured to move powder in some manner. As shown, the powder handling device 10 includes a mounting portion 12 configured to interface with a powder container 14 (shown in partial pantom). The powder container 14 may be configured as a UN certified powder transportation container, and may be metallic, plastic, composite, or of other various construction. As described in greater detail below, a liner (not shown) may or may not be provided in the powder container 14. The powder container 14 may also be configured with an inert applied lining or may use relatively non-reactive materials such as stainless steel.

The mounting portion 12 is sized and shaped to fit the powder container 14. For example, the mounting portion 12 may be sized and shaped to match an existing lid pattern of the powder container 14. In this example, the mounting portion 12 of the powder handling device 10 could simply be substituted for an existing lid (not shown) of the powder container, saving time and limiting the amount of exposure of the powder container therein.

The mounting portion 12 may be configured in various ways to mount to the powder container 14. In the embodiment of FIG. 1, a mounting interface 16 is provided on the mounting portion 12. The mounting interface 16 may be configured, as described above, to match an existing lid pattern of the powder container 14. For example, the mounting interface 16 may be sized and shaped to match a circumferential opening profile of the powder container 14. The mounting interface 16 may be configured to receive a fixture device 34. The fixture device 34 may be configured as a band clamp as shown, and may be compatible with the mounting portion 12 and an existing lid (not shown) of the powder container 14. It should be appreciated that the fixture device could be otherwise configured, for example in any suitable configuration to provide a sealing relationship between the mounting portion 12 and the powder container 14.

The mounting interface 16 may also be otherwise configured. As above, the mounting interface 16 may be sized and shaped to receive a clamping load, for example to dimensionally match a band clamp usable with an existing lid (not shown). Alternatively, alternative fixturing may be provided, for example with fasteners passing through the mounting interface 16. Furthermore, proportions and features of the mounting interface 16 may be altered relative to an existing lid (not shown) of the powder container 14. In an embodiment, a thickness of the mounting portion 12 is greater than a corresponding thickness of an existing certified lid (not shown) of the powder container 14. In this way, the mounting portion 12 can account for process-induced stresses, such as through pressure differentials as described in greater detail below. The thickness of the mounting portion 12 may be at least 5 percent, 10 percent, 15 percent, 20 percent, or 25 percent greater than the corresponding thickness of the exiting certified lid (not shown).

Still referring to FIG. 1, the powder handling device 10 further includes a powder suction unit 18. As shown, the powder suction unit 18 passes through a plane P defined by the mounting portion 12. The plane P may also be used to define an opening of the powder container 14, shown covered by the mounting portion 12. As shown in FIG. 1, the powder suction unit 18 is at a rest state, where a user is not applying force to the powder suction unit 18. In this rest state, the powder suction unit 18 may be disposed substantially orthogonally to the plane P, for example perpendicular thereto, or within a range variance of 5 degrees, 10 degrees, or 15 degrees thereto. From this state, the powder suction unit 18 is movable relative to the mounting portion 12 in at least one degree of freedom. For example, the powder suction unit 18 may be movable in the Y-direction (e.g., upward direction U and/or the downward direction D), in a plane defined by the x-direction (X) and the Z-direction (Z), or both.

A flexible gasket 20 may form a hermetic seal between the mounting portion 12 and the powder suction unit 18. Additionally, the powder suction unit 18 may be moveable in at least one degree of freedom at least in part by a flexible gasket 20. As shown in FIG. 1, the flexible gasket 20 is adaptable to allow relatively free movement of the powder suction unit 18 with respect to the powder container 14. The flexible gasket 20 may be configured to provide a desired centering force to set or bias towards the rest state as described above. In an embodiment, the flexible gasket 20 is configured as an elastomeric bellows; however, it will be understood that any suitable body may be utilized, such as a flexible liner, a seal (e.g., a rubber seal), etc. Such an embodiment of the flexible gasket 20 may be tunable based on size of the powder container 14, type of powder, and/or user preference. For example, the flexible gasket 20 may have a 55 shore hardness, a 60 shore hardness, a 65 shore hardness, and/or a 70 shore hardness, based on one or more applications. In various embodiments, the flexible gasket 20 may be specifically configured to reduce static discharge, for example employing a static-dissipative material. For example, in an embodiment, the flexible gasket 20 is formed of an ethylene-based elastomer.

The powder suction unit 18 may be controllable by a user through a handling portion 38 configured for manual operation. It should also be appreciated that the powder suction unit 18 may be at least partially, and potentially fully automated. For example, the handling portion 38 may be moved in any suitable manner by an actuator (not shown), such as attached to the powder suction unit 18. Alternatively, the handling portion 38 may be moved by the pressure delta created in the powder container 14 by the flexible gasket 20, by gravity as contents within the container is removed and the handling portion 38 resting thereon falls with the upper powder level, by a user manipulating the handling portion 38 by hand, or any combination thereof.

For instance, manual operation of the powder suction unit 18 may be used to access powder from the powder container 14. As shown, a user may apply downward force to the handling portion 38 to move the powder suction unit 18 in the downward direction D and may apply upward force to the handling portion 38 to move the powder suction unit in the upward direction U. Additionally, a user may apply a radial force to the handling portion 38 to move the powder suction unit 18 in the x-direction X, the z-direction Z or both, such that the suction unit inlet 22 is moved around radially within the powder container 14. This control of movement may be used as a level or height of powder in the powder container 14 decreases, with the user applying force to the handling portion 38 in the downward direction D, with gravity pulling the handling portion 38 in the downward direction D, or both throughout the process. The flexible gasket 20 may also be configured to bias towards the downward direction D. Additionally or alternatively, as described in greater detail with reference to FIG. 3 below, a pressure differential may act on the powder suction unit 18 and/or the flexible gasket 20 to bias the powder suction unit 18 in the upward direction U and/or the downward direction D based on a state of the powder handling device 10.

The powder suction unit 18 further includes a suction unit inlet 22 configured to receive powder from the powder container 14. As shown in FIG. 1, the suction unit inlet 22 is disposed within the powder container 14 when the mounting portion is in its attached state. The suction unit inlet 22 is configured to remove powder from the powder container 14 with a pressure differential, for example by a flow device 70 (FIG. 3) attached to the powder suction unit 18. In this way, the powder suction unit 18 is operable to remove powder from the powder container 14.

Given the freedom of movement afforded by the configuration of the powder suction unit 18 and flexible gasket 20, the powder suction unit 18 may be operable to reach all or substantially all areas of the interior of the powder container 14. For example, the powder suction unit 18 may be movable so that the powder suction unit 18 is movable adjacent to all lower extremities of the powder container 14. In this manner, an operator can control the powder suction unit 18 with the handling portion 38 to remove all or substantially all powder from the powder container. Furthermore, movement of the powder suction unit 18 may be used to avoid jamming or clogging, for example by moving the suction unit inlet 22 away from the powder.

The powder suction unit 18 may further comprise a standoff device 32. As shown, the standoff device 32 defines the lower extreme of the powder suction unit 18. The standoff device may be configured to control a minimum distance between the powder suction unit 18 and an interior of the powder container 14 and/or a powder therein. The standoff device 32 may be configured as a cage, grate, or side ventilation; and may generally avoid problems related to clogging of the suction unit inlet 22. Exemplary embodiments of the standoff device 32 may optionally include at least one secondary inlet 33 facilitating flow towards the suction unit outlet 24, for example even in the suction unit inlet 22 is clogged or jammed. In various embodiments, the standoff device 32 may be configured to be adjustable or removable based on user preference or powder handling requirements. Furthermore, the powder suction unit 18 may similarly be adjustable or replaceable to accommodate user preference or powder handling requirements.

Still referring to the powder suction unit 18 of FIG. 1, a suction unit outlet 24 is provided opposite the suction unit inlet 22. The suction unit outlet 24 is configured to receive powder from the powder container 14 through the suction unit inlet 22. The suction unit outlet 24 may thus be connected to a flow device 70 (FIG. 3) to provide motive force, such as a vacuum, to move powder from the powder container 14 up the powder suction unit 18. Once the powder is removed from the powder container 14 it can be used in the desired processes. The powder suction unit 18 may also be used to move gaseous components, for example to purge or control and internal atmosphere as described in greater detail below with reference to FIG. 3.

Use of the powder suction unit 18 as described above beneficially allows retrieval of all or substantially all of the powder from a given powder container 14. In doing so, application of the powder suction unit 18 may avoid complications such as fluidization, vibration, agitation, tilting, lifting, etc. of powder or the powder container 14 to facilitate complete removal. Of course, it should be appreciated that these techniques may still be used depending on use case and applicability of the given powder container 14.

Still referring to FIG. 1, the powder handling device 10 may further include an inlet to the external environment, for example a mounting portion inlet 26 disposed on the mounting portion 12. The mounting portion inlet 26 as shown in FIG. 1 includes a fluid flow valve 27 such that the mounting portion inlet 26 allows for fluid flow into the powder container 14. The fluid flow valve 27 may control the fluid flow therethrough and into the powder container 14 in an active manner (e.g., an actuated valve) or a passive manner (e.g., a passive valve). For example, the mounting portion inlet 26 may provide a relatively high pressure source in comparison to the pressure source at the suction unit inlet 22 such that fluid flow (e.g., a carrier gas, air, etc.) moves from the mounting portion inlet 26, through the powder container 14, and into the suction unit inlet 22. It should be appreciated that this pressure differential for flow could be generated by suction or blowing devices (not shown).

During flow operation, a pressure differential may exist between the interior of the powder container 14 and the external environment. For example, a pressure differential of 1, 2, 3, 4, 5, or 6 PSI may be maintained between the interior of the powder container 14 and the external environment. It should be appreciated that this pressure differential may vary, for example with clogging or jamming of the powder suction unit 18 resulting in an increased pressure differential. As described in greater detail below with reference to FIG. 3, this increased pressure differential may be used to control the powder suction unit 18 to move away, in the upward direction U from clogging powder material.

Still referring to FIG. 1, a relief valve 30 may be provided with the powder handling device 10. As shown, the relief valve 30 may be provided disposed on the mounting portion 12. It should be appreciated that the relief valve 30 may also be integrated into one or more existing components of the powder handling device 10. The relief valve 30 is configured to control a maximum pressure differential between an interior of the powder container 14 and an exterior of the powder container 14. For example, as described above, a positive relative pressure may exist inside the powder container 14 during operation. The relief valve 30 may be provided to avoid over pressurizing the powder container 14, for example through clogging of the powder suction unit 18. It should be appreciated that the relief valve 30 may be tunable to relieve pressure at a given relative pressure depending on user preferences and/or safety requirements of a given powder or operation.

The powder handling device 10 of FIG. 1 further includes a viewing module 40. The viewing module 40 as shown is disposed on the mounting portion 12. The viewing module 40 may include a light source and/or a viewport or sight glass. It should also be appreciated that a plurality of viewing modules 40 may be provided, for example with a first viewing module providing a light source and a second viewing module providing a viewport. The viewing module 40 may facilitate operator ease of use and ensure accurate movement of the powder suction unit 18.

Figure 2:
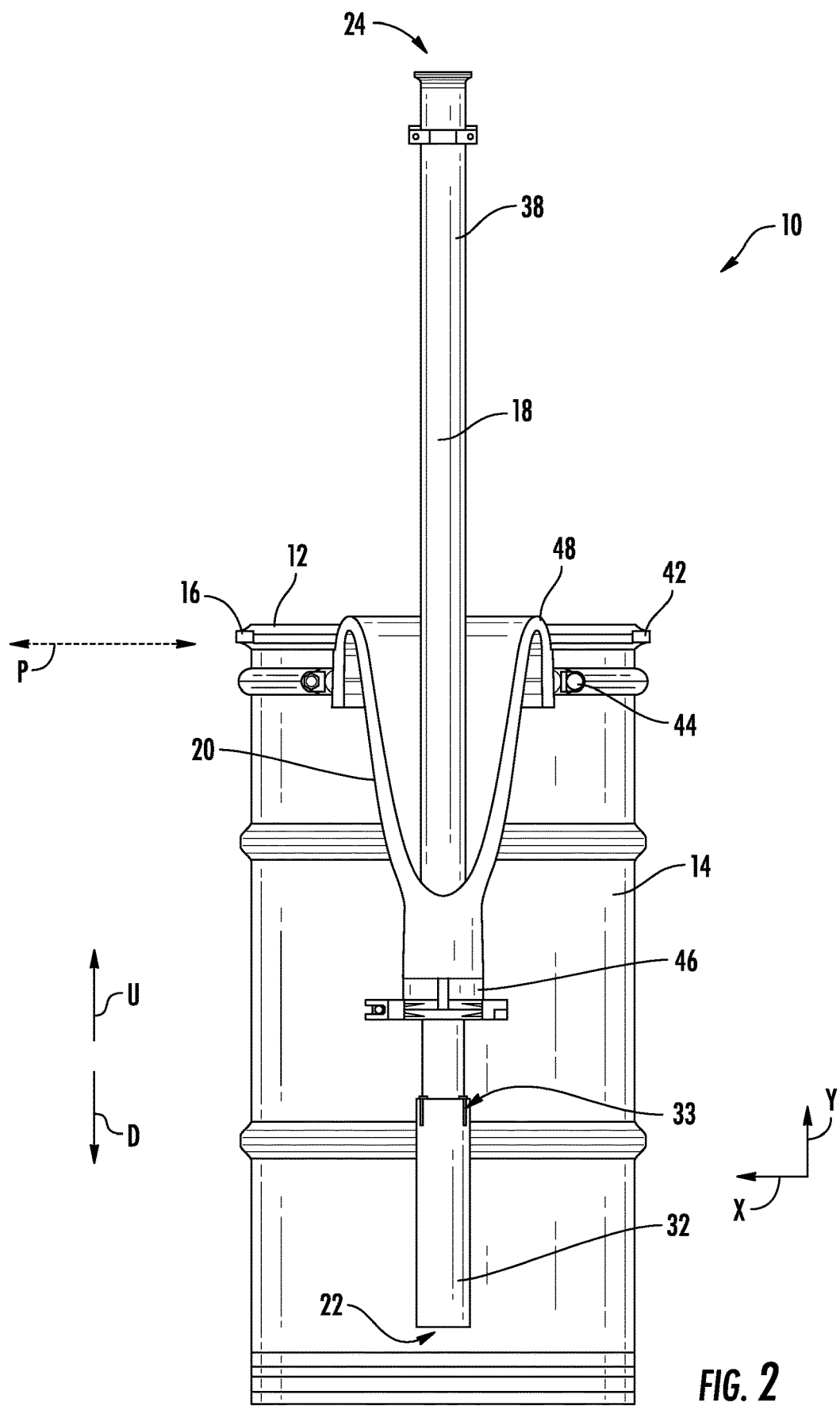
FIG. 2 is a sectional schematic of the powder handling device of FIG. 1 taken along line 2-2 perpendicular to plane P.

Turning now to FIG. 2, a sectional view of the embodiment of FIG. 1 is shown, taken in front of the line 2-2 in front of the handling portion 38 to cut away in the flexible gasket 20. As shown in FIG. 2, various sealing arrangements may be provided in the powder handling device 10 to ensure powder containment. A mounting seal 42 is provided between the mounting portion 12 and the powder container 14. The mounting seal 42 may be a compressible seal, such as an elastomeric seal, configured to compress with mounting of the mounting portion 12 to the powder container 14, for example with the sealing device 36 (see FIG. 1). It should also be appreciated that a sealing arrangement may be provided by the components themselves, for example with the mounting portion 12 being configured to form the mounting seal 42 upon mounting with the powder container 14.

The flexible gasket 20 as shown in FIG. 2 is sealed against the mounting portion 12 and the powder suction unit 18. A gasket seal 44 is provided to seal the mounting portion 12 against the flexible gasket 20 and a suction unit seal 46 is provided to seal the powder suction unit 18 against the flexible gasket 20. Each of the gasket seal 44 and the suction unit seal 46 may be configured as an elastomeric seal. The gasket seal 44 and the suction unit seal 46 may be removable from the respective components or may be integrated therewith. For example, one or both of the gasket seal 44 and the suction unit seal 46 may be integral to the flexible gasket 20.

Still referring to FIG. 2, the flexible gasket 20 may further be provided with at least one articulation 48. The articulation 48 may be provided to facilitate movement of the powder suction unit 18 across the extremes of the powder container 14, for example around the inner lower circumference of the powder container 14 shown in FIG. 2. The articulation 48 may also facilitate movement in the upward direction U and the downward direction D. In some embodiments, the articulation 48 may also be referred to as a bellows. The articulation 48 may also function in part as a labyrinth seal, for example by reducing powder exposure to one or more of the other seals 42, 44, 46.

Figure 3:
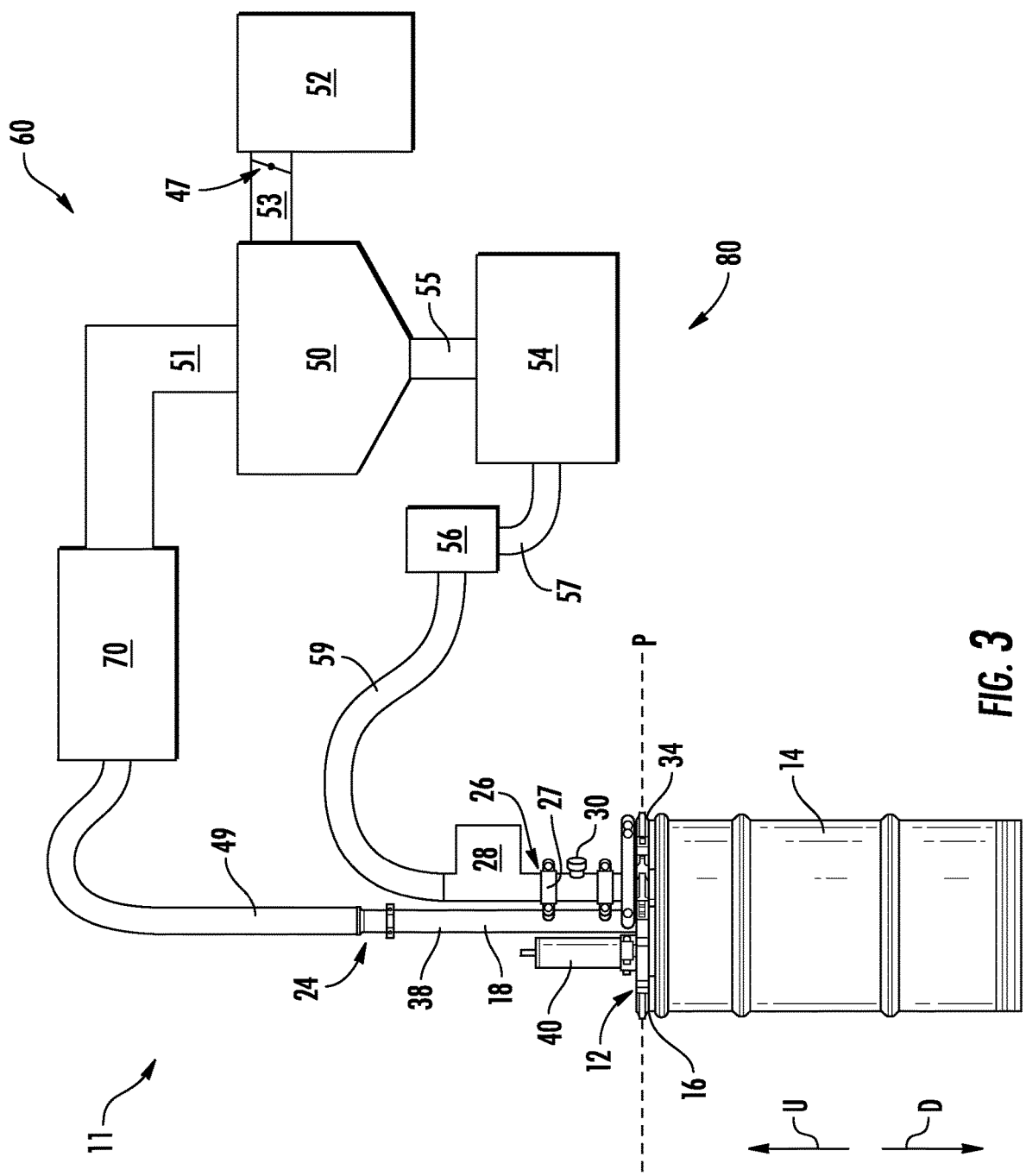
FIG. 3 is side schematic view of a powder handling apparatus including a powder handling device (e.g., the powder handling device of FIG. 1).

Turning now to FIG. 3, a powder handling apparatus 11 is shown to include a powder handling device 10 as in FIGS. 1 and 2. The powder handling apparatus 11 of FIG. 3 includes the powder handling device 10 and a flow circuit 60. The flow circuit 60 may be used to control an atmosphere within the powder handling apparatus 11 and/or to transport powder to where it is needed.

Beginning with the suction unit outlet 24, the flow circuit connects thereto with an outlet conduit 49. The outlet conduit 49 as shown is configured to not impede the required movement of the powder suction unit 18 as described above. For example, the outlet conduit 49 may be flexible and/or may be suspended with adjustable or automated supports (not shown).

It is contemplated that the flow circuit 60 can be a closed loop circuit, such that the outlet conduit 49 is connected to various components before returning flow to the mounting portion inlet 26. However, it is to be understood that on open loop circuit could also be utilized. The components of the flow circuit 60 may be included or omitted depending on a given use case. Furthermore, it should be appreciated, as above, that one or more components of the powder handling apparatus 11 may be combined. For example, as shown in FIG. 3, the relief valve 30 may be included in the mounting portion inlet 26.

Continuing with the flow circuit 60 of FIG. 3, a flow device 70 creates flow from the outlet conduit 49 towards the flow device 70. The flow device 70 may be a pump, such as a suction and/or blower fan configured to generate flow (e.g., a vacuum machine). It should be appreciated that the flow device 70 may also include one or more spark arresting features (not shown) or may be positioned downstream of a spark arrestor (not shown) or other component configured to reduce the probability of combustion.

Downstream of the flow device 70, flow continues through the flow circuit 60 into a downstream conduit 51. The downstream conduit 51 may be flexible as with the outlet conduit 49 as described above. Alternatively, the downstream conduit 51 may be rigid and/or fixed. It should be appreciated that between components not requiring relative movement therebetween, rigid or even integrated connections between components is possible. For example, each of the components downstream of the flow device 70 and upstream of the mounting portion inlet 26 may be positionally fixed relative to one another. In various embodiments, the downstream conduit 51 and/or various other components may be configured as a heat exchanger. For example, the downstream conduit 51 as shown may be an air-to-air heat exchanger to reduce temperature added by the flow device 70. The downstream conduit 51 may also be configured as any other configuration of heat exchanger, for example air-to-water heat exchangers, evaporation chambers, etc.

The downstream conduit 51 provides flow from the flow device 70 to a separator 50. The separator 50 is configured to separate gas flow from powder flow, for example to collect powder and to return powder-free gas. The separator 50 may be configured as a cyclonic separator or may otherwise be configured to separate at least a portion of powder from gasflow in the flow circuit 60.

The separator 50 as shown has a first outlet 53 and a second outlet 55. The first outlet 53 continues to a powder collector 52. The powder collector 52 may be configured to dispense collected powder, for example to a manufacturing apparatus (not shown). The powder collector 52 may also be configured to facilitate removal of powder without creating an open loop in the system. For example, the powder collector 52 may be selectively open to the flow circuit 60 through a valve arrangement 47. It should also be appreciated that design of the flow circuit 60 may facilitate maintaining such a closed-loop environment through control of pressure differential as well. For example, a positive relative pressure may be generated in the powder collector 52 when powder is not being collected.

The second outlet 55 from the separator 50 provides flow back towards the powder container 14. The flow from the second outlet 55 has been separated to include mostly the gas portion of flow. However, some powder may remain in this flow. As shown in FIG. 3, a circuit filter 54 may be provided to remove any powder that would otherwise be returned to the powder container 14. The circuit filter 54 may also be configured to collect additional powder for use.

Downstream of the circuit filter 54, a sensor inlet 57 is provided to a sensor 56. The sensor 56 may be used for monitoring the environment of the flow circuit 60 and the powder container 14. The sensor 56 provides ability to control a given environment within the powder handling apparatus 11. For example, the sensor 56 can monitor for an inert environment (for example below a certain oxygen level) before initiating conveying powder. This monitoring can avoid issues associated with volatility of certain powder, for example to avoid humidity pick-up or gas contaminant pick-up. Certain powders, for example titanium-based powders, may also require monitoring to ensure safety from combustion events.

From the sensor 56 is a sensor outlet 59 which leads back to the powder container 14. In the embodiment of FIG. 3, the sensor outlet 59 leads directly to a filter unit 28. The filter unit 28 in this case is attached to mounting portion inlet 26 to ensure filtering of any contaminants that would otherwise be drawn into the powder container 14. As in this embodiment, a plurality of components for filtering (such as the filter unit 28 and the circuit filter 54) may cooperate with one another and/or provide redundancy to ensure sufficient filtering of the flow circuit 60.

Each of the above components of the flow circuit 60 may be collectively referred to as a handling unit 80. The handling unit 80 may comprise any combination of these components and may further include other components, for example to control temperature. The handling unit 80 is disposed flow-wise between the suction unit outlet 24 and the mounting portion inlet 26, and may be configured to handle flow therebetween in the various ways described herein.

As described briefly above, the closed-loop configuration of the powder handling apparatus 11 may facilitate a type of automatic control of the powder suction unit 18. For example, the powder suction unit may be configured to movably react based on a pressure differential between an interior of the powder container 14 and an exterior of the powder container 14. As a relatively high pressure exists in the powder container 14 during pumping of powder through the flow circuit 60, the powder suction unit 18 may initially be biased in the upward direction U compared to when the flow device 70 is not running or when the flow circuit 60 is not closed. During this state, the relatively high pressure inside the powder container 14 acts on the flexible gasket 20 and the powder suction unit 18 to bias them in the upward direction U. As used herein, the terms "relatively high pressure" and "relatively low pressure" relate to the relationship between pressure on the interior of the powder container 14 relative to pressure on the exterior of the powder container 14. That is, assuming no pressure differential, the powder suction unit 18 in this embodiment would have no upward or downward bias; a greater internal pressure (relatively high pressure in the powder container 14) will bias the powder suction unit 18 in the upward direction U; and a greater external pressure (relatively low pressure in the powder container 14) will bias the powder suction unit 18 in the downward direction D.

Furthermore, pressure changes during operation in the closed-loop of the flow circuit 60 can change this biasing. For example, if the suction unit inlet 22 clogs or jams, the flow device 70 will continue to increase the pressure differential between the suction unit outlet 24 and the mounting portion inlet 26, thus increasing a pressure within the powder container 14 relative to the external environment. Accordingly, this configuration of the flexible gasket 20 and the powder suction unit 18 is configured to bias in the upward direction U responsive to a relatively high pressure inside the powder container 14, for example due to clogging. This upward bias may act to move the suction unit inlet 22 away from the powder causing the jam and thus relieve the jam. Once the jam has been relieved, the pressure inside the powder container 14 will reduce and so will the pressure biasing the flexible gasket 20 and the powder suction unit 18 in the upward direction. Accordingly, the flexible gasket 20 and the powder suction unit 18 may be thus configured to bias in the downward direction D responsive to a relatively low pressure inside the powder container 14.

Further aspects are provided by the subject matter of the following clauses:

A powder handling device comprising: a mounting portion defining a plane and comprising a mounting interface; a fixture device configured to mount the mounting portion over an opening of a powder container at a mounting interface; and a powder suction unit attached to the mounting portion and passing through the plane, wherein the powder suction unit is movable relative to the mounting portion with at least one degree of freedom.

The powder handling device of any preceding claim, wherein the powder suction unit is disposed substantially orthogonally to the plane at a rest state.

The powder handling device of any preceding claim, further comprising: a flexible gasket within the mounting portion of the powder handling device through which the powder suction unit passes.

The powder handling device of any preceding claim, wherein the flexible gasket is configured to bias the powder suction unit towards the rest state.

The powder handling device of any preceding claim, wherein the flexible gasket forms a hermetic seal between the mounting portion and the powder suction unit.

The powder handling device of any preceding claim, further comprising: a mounting portion inlet including a fluid flow valve.

The powder handling device of any preceding claim, wherein the powder suction unit comprises: a suction unit inlet on one side of the powder suction unit to receive a powder from the powder container; and a suction unit outlet disposed on an opposite side of the powder suction unit from the suction unit inlet.

The powder handling device of any preceding claim, wherein the mounting portion inlet and the suction unit outlet are fluidly connected independently to a flow device such that a closed loop system is formed.

The powder handling device of any preceding claim, further comprising: a filter unit disposed between the suction unit outlet and the mounting portion inlet.

The powder handling device of any preceding claim, further comprising: a relief valve within the closed loop system.

The powder handling device of any preceding claim, wherein the fluid flow valve is controlled with an actuator.

The powder handling device of any preceding claim, wherein the fluid flow valve is a passive fluid flow valve.

A powder handling apparatus, comprising: a powder container defining an opening; and the powder handling device of any preceding claim, wherein the mounting interface is attached over the opening of the powder container.

The powder handling apparatus of any preceding claim, wherein the powder suction unit is configured to bias in an upward direction responsive to a relatively high pressure inside the powder container compared to an external pressure around the powder container and to bias in a downward direction responsive to a relatively low pressure inside the powder container compared to the external pressure around the powder container.

The powder handling apparatus of any preceding claim, wherein the powder suction unit further comprises a standoff device configured to control a minimum distance between the powder suction unit and an interior of the powder container.

The powder handling apparatus of any preceding claim, wherein the powder suction unit is configured to movably react based on a pressure differential between an interior of the powder container and an exterior of the powder container.

The powder handling apparatus of any preceding claim, further comprising: a powder suction unit attached to the mounting portion, the powder suction unit comprising: a suction unit inlet disposed inside the powder container; and a suction unit outlet disposed outside the powder container; and a handling unit disposed flow-wise between the suction unit outlet and the mounting portion inlet.

A closed-loop powder handling apparatus, comprising: a powder container defining an opening; a mounting portion defining a plane and comprising a mounting interface attached to the opening of the powder container; a powder suction unit attached to the mounting portion, the powder suction unit comprising: a suction unit inlet disposed inside the powder container; and a suction unit outlet disposed outside the powder container; and a handling unit disposed flow-wise between the suction unit outlet and the mounting portion inlet.

The closed-loop powder handling apparatus of any preceding claim, wherein a flexible gasket is positioned within the mounting portion, and wherein the powder suction unit passes through the flexible gasket.

The closed-loop powder handling apparatus of any preceding claim, wherein a fluid flow valve is positioned within the mounting portion.

A powder handling device comprising: a mounting portion sized and shaped to fit a powder container, the mounting portion defining a plane and comprising a circumferential mounting interface sized and shaped to receive a clamping load; and a powder suction unit attached to the mounting portion and passing through the plane, wherein the powder suction unit is movable relative to the mounting portion with at least one degree of freedom.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

We claim:

1. A powder handling device comprising:
   a powder container defining an opening;
   a mounting portion defining a plane and comprising a mounting interface and a mounting portion inlet including a fluid flow valve;
   a fixture device configured to mount the mounting portion over the opening of the powder container at the mounting interface;
   a powder suction unit attached to the mounting portion and passing through the plane, wherein the powder suction unit is movable relative to the mounting portion with at least one degree of freedom and includes a suction unit inlet on one side of the powder suction unit to receive a powder from the powder container and a suction unit outlet disposed on an opposite side of the powder suction unit from the suction unit inlet, wherein the mounting portion inlet and the suction unit outlet are fluidly connected independently to a flow device such that a closed loop system is formed; and
   a relief valve disposed within the closed loop system.

2. The powder handling device of claim 1, wherein the powder suction unit is disposed substantially orthogonally to the plane at a rest state.

3. The powder handling device of claim 2, further comprising:
   a flexible gasket within the mounting portion of the powder handling device through which the powder suction unit passes.

4. The powder handling device of claim 3, wherein the flexible gasket is configured to bias the powder suction unit towards the rest state.

5. The powder handling device of claim 3, wherein the flexible gasket forms a hermetic seal between the mounting portion and the powder suction unit.

6. The powder handling device of claim 1, further comprising:
   a filter unit disposed between the suction unit outlet and the mounting portion inlet.

7. The powder handling device of claim 1, wherein the fluid flow valve is controlled with an actuator.

8. The powder handling device of claim 1, wherein the fluid flow valve is a passive fluid flow valve.

9. A powder handling apparatus, comprising:
   the powder container; and
   the powder handling device of claim 1, wherein the mounting interface is attached over the opening of the powder container.

10. The powder handling apparatus of claim 9, wherein the powder suction unit is configured to bias in an upward direction responsive to a relatively high pressure inside the powder container compared to an external pressure around the powder container and to bias in a downward direction responsive to a relatively low pressure inside the powder container compared to the external pressure around the powder container.

11. The powder handling apparatus of claim 9, wherein the powder suction unit further comprises a standoff device configured to control a minimum distance between the powder suction unit and an interior of the powder container.

12. The powder handling apparatus of claim 9, wherein the powder suction unit is configured to movably react based on a pressure differential between an interior of the powder container and an exterior of the powder container.

13. The powder handling apparatus of claim 9, further comprising:
   a handling unit disposed flow-wise between the suction unit outlet and the mounting portion inlet.

14. A closed-loop powder handling apparatus, comprising:
   a powder container defining an opening;
   a mounting portion defining a plane and comprising a mounting interface attached to the opening of the powder container;
   a powder suction unit attached to the mounting portion, the powder suction unit comprising:
      a suction unit inlet disposed inside the powder container; and
      a suction unit outlet disposed outside the powder container;
   a handling unit disposed flow-wise between the suction unit outlet and the mounting portion; and
   a relief valve disposed within the closed loop powder handling apparatus.

15. The closed-loop powder handling apparatus of claim 14, wherein a flexible gasket is positioned within the mounting portion, and wherein the powder suction unit passes through the flexible gasket.

16. The closed-loop powder handling apparatus of claim 14, wherein a fluid flow valve is positioned within the mounting portion.

* * * * *